UNITED STATES PATENT OFFICE.

C. VAN VLECK, OF MACOMB, ILLINOIS.

IMPROVEMENT IN RESINOUS COMPOUNDS FOR COVERING HAMS.

Specification forming part of Letters Patent No. 17,709, dated June 30, 1857.

*To all whom it may concern:*

Be it known that I, CARTER VAN VLECK, of Macomb, in the county of McDonough and State of Illinois, have invented a new and useful composition of matter for covering hams and other provisions and other bodies for their protection against decomposition or decay; and I do hereby declare that the following is a full, clear, and exact description of the same.

This composition consists of rosin, gutta-percha, and tallow, or other fatty or oleaginous matter, combined in the proportion, by weight, of forty parts of rosin, five parts of gutta-percha, and four parts of tallow or other fatty or oleaginous matter.

To enable others skilled in the art to make and use my composition, I will proceed to describe the process of manufacturing and using the same.

In a suitable kettle placed over a brisk fire, or heated in any other way, I first place the rosin and heat the same till it is all melted, then add the gutta-percha, (which is in its crude state, but cut up finely to facilitate its melting,) and continue the heat to boil the rosin till all the gutta-percha is melted, after which I add the tallow or other fatty or oleaginous matter, and in a few minutes the whole of the ingredients are thoroughly incorporated together and ready for use.

Hams preparatory to being covered with this composition should be covered tightly, first, with a thickness of heavy paper and afterward with a thickness of strong "domestic" or other woven fabric, the edges of which should be closely sewed. They may then be covered by dipping them in the composition, which should have been previously allowed to cool sufficiently to prevent it scalding the meat. Other provisions may be covered in the same way. Some articles may more conveniently be covered with the composition by laying it on them with a brush.

The composition may be at any time remelted for use, after having been allowed to cool and set.

This composition makes a cheap, durable, and perfect water and air proof covering for provisions, and will serve for coating many other substances or bodies for which a covering of such character is required to preserve them from decomposition or decay. The rosin, which constitutes more than four-fifths of the whole, is a substance well calculated for an air and water proof connection, but wants tenacity and flexibility. The requisite tenacity is produced by the gutta-percha and the flexibility by the tallow or other grease, and thus the composition is made to possess every requisite for the purpose for which it is designed.

In the rejected application of Robert Arthur, 1855, for a patent for a cement for sealing cans gutta percha and rosin are used and melted in combination. Therefore I distinctly disclaim the melting or boiling together of gutta-percha and rosin. In Chilcott and Snell's rejected application for a patent, 1853, gutta-percha, rubber, pitch, turpentine, and oil, or oleaginous substances were used; but although the three ingredients employed by me are there used, they are combined in such widely different proportions from my combination as to dispossess the ingredients of those virtues which they exhibit when employed in the proportions named in my composition.

My composition possesses the virtue of great liquidity when heated, so that it will coat a substance evenly if immersed in it; or if applied to an object the composition may be rapidly, evenly, and easily spread. If the proportions of my composition were substantially changed, these results would not be obtained. I find by experiment, for example, that if double the quantity of gutta-percha is used the resultant mass is rendered so mucilaginous and ropy that it cannot be applied except with great difficulty. Hence the composition of Chilcott and Snell, even if it had no other differences, could not be used in place of mine, and it is entirely wanting in that essential characteristic of mine—viz., liquidity under heat. Chilcott and Snell use nearly sixty-six per cent. of gutta-percha, which proportions, with the other ingredients employed by me, would make merely a soft gum under any practical degree of heat, and such a composition could not be practically used for coating provisions and other analogous articles. My composition possesses the further virtue of being free from disagreeable odor and of not imparting to the articles to which it is applied any bad smell or or taste; but in the cement of Arthur, before alluded to, shellac is used, which, it is well known, imparts a disagreeable taste when applied to edibles. The same objection exists in regard to Chilcott and Snell's cement to a much greater extent. The turpentine required to cut the rubber would impart to the provisions an exceedingly repulsive taste. The covering of textile material would afford no protection, because turpentine, when heated, becomes very volatile and easily penetrates a number of thicknesses of cloth.

Billing's composition, patented 1850, is also objectionable, owing to the bad taste imparted by the linseed-oil and shellac.

My composition also possesses the virtue of cheapness. Its principal component is rosin—a substance which costs but little. Chilcott and Snell's composition could not be advantageously used for any purpose, owing to its great expense, nearly sixty-six per cent. being composed of gutta-percha, the average cost of which in this country is at present forty cents per pound. About sixteen per cent. of their cement is india-rubber, the present cost of which is fifty cents per pound in this country. To these costs—saying nothing of the expense of the other ingredients—add the cost of boiling for three days, the expense of apparatus, &c., and it will be seen how far superior in point of cheapness my cement is.

There is a peculiar virtue in the proportions of the ingredients employed by me, because, first, if the quantity of gutta-percha be much increased the composition will be rendered too mucilaginous or ropy for use; second, if the quantity of tallow be much increased, the composition will be rendered too pliable, sticky, and easily rubbed off; third, if the quantity of rosin is much increased, the composition will become too brittle, will crack by changes of atmospheric temperature, and fall off by handling.

I confine myself substantially to the proportions of ingredients herein specified.

What I claim, and desire to secure by Letters Patent, is—

The within-described composition for covering hams and other provisions or other bodies for the purpose of preserving them from decay or decomposition, consisting of rosin, gutta-percha, and tallow in the proportions substantially as herein specified.

CARTER VAN VLECK.

Witnesses:
WM. P. RICHARDS,
W. H. NEECE.